United States Patent [19]

Wilkening et al.

[11] Patent Number: 4,805,976
[45] Date of Patent: Feb. 21, 1989

[54] COUPLING MEANS FOR MONOMODE FIBER

[75] Inventors: Günter Wilkening, Braunschweig; Rolf Krüger, Vechelde, both of Fed. Rep. of Germany

[73] Assignee: Carl-Zeiss-Stiftung, Heidenheim, Fed. Rep. of Germany

[21] Appl. No.: 44,707

[22] Filed: May 1, 1987

[30] Foreign Application Priority Data

May 9, 1986 [DE] Fed. Rep. of Germany ....... 3615727

[51] Int. Cl.[4] .............................................. G02B 6/36
[52] U.S. Cl. .............................. 350/96.2; 350/96.15; 350/96.29
[58] Field of Search ............... 350/96.1, 96.15, 96.2, 350/96.29, 96.3, 96.33

[56] References Cited

U.S. PATENT DOCUMENTS 3,516,001 6/1970 Koester et al. ............. 350/96.33 X

OTHER PUBLICATIONS

Ulrich et al; "Beam-to-Fiber Coupling With Low Standing Wave Ratio"; Jul. 15, 1980; vol. 19, No. 14; *Applied Optics*; pp. 2453–2456.

Primary Examiner—John D. Lee
Assistant Examiner—John Ngo
Attorney, Agent, or Firm—Hopgood, Calimafde, Kalil, Blaustein & Judlowe

[57] ABSTRACT

The fiber end which is developed as the situs of coupling to incident laser radiation is inserted into a transparent capillary (14) and beveled in order to mask reflections out of the direction of the optical axis. The capillary is roughened on the outside and is surrounded by a light-absorbing layer (15) which acts as a light trap, to eliminate such disturbing stray light as may be coupled into the fiber alongside the core (11).

10 Claims, 2 Drawing Sheets

COUPLING MEANS FOR MONOMODE FIBER

BACKGROUND OF THE INVENTION

The present invention relates to coupling means for coupling of laser radiation into a monomode optical fiber of polarization-maintaining type.

Optical fibers of this special type are required, for example, in order to provide a flexible connection between an interferometer and the laser generator used to supply it. For such uses, it is extremely important to eliminate disturbing light of undefined condition of polarization since such disturbing light not only reduces the contrast of measurement signals but can, in the event of back-scattering along the optical axis, also adversely influence the control means of a laser generator wherein, for length-measurement purposes, frequency must be maintained stable to $1^{-7}$.

From European Pat. No. B1-0,031,274, it is known, in the case of annular interferometers of the Sagnac type, to bevel the ends of monomode fibers into which the laser beam is coupled. But said patent gives no further information with regard to the development of the coupling means.

Federal Republic of Germany No C2-2,723,972 describes a monomode-fiber coupling element which employs a transparent capillary. In that case, however, the capillary within which the fiber is eccentrically bonded, serves only as a holding element. No information as to coupling factor or freedom from disturbing light can be noted from said patent.

Federal Republic of Germany No. A1-3,431,996 describes a sensor in the form of an optical fiber having a beveled end contained in a transparent mount. The end surfaces of the fiber and mount are, however mirror surfaces, with the exception of the cross section of the core, so as to utilize light-impingement outside the core to obtain a reference signal. Aside from the fact that this fiber is not a monomode fiber of the polarization-maintaining type (and thus, if only for this reason, is unsuitable for supplying interferometers), a relatively high level of scattered light is present as a result of mirror action at the end surface.

BRIEF STATEMENT OF THE INVENTION

The object of the present invention is to develop coupling means for coupling of laser radiation into an optical fiber of the aforementioned type with highest possible coupling efficiency, while also reliably avoiding disturbing scattered light, particularly light which is scattered back on the optical axis.

The invention achieves this object by mounting the end of the optical fiber by insertion into a transparent capillary, wherein both the fiber end and the end of the capillary are beveled, and wherein the capillary is surrounded by a jacket of light-absorbing material.

In this solution, light which enters alongside the core, for example in the fiber sheath (cladding) or in the capillary, passes to the outer periphery of the capillary, which acts as a light trap and absorbs practically all potentially disturbing light. Such light as may be reflected, despite anti-reflection precautions prior to entrance into the fiber, is effectively masked out of the optical axis by the inclination of the beveled end surface. Since the intensity of light scattered by reflective surfaces is proportional to their reflectivity, a clear reduction in scattered light is obtained as compared with the prior art, in which the fiber is mounted directly in metal or in which the region of the end surface around the fiber is mirror-finished. The indicated measures are found to cooperate in a $10^{-4}$ suppression of disturbing light in the direction of the optical axis of light impinging on the situs of coupling. As a result, the control of frequency-stabilized double-mode lasers is not adversely affected.

For absorption of disturbing light, it is advantageous to externally roughen the capillary and to use an opaque adhesive by which the externally roughened capillary is bonded into its metal mount. The optical fiber itself is advisedly bonded, with its protective covering removed, into the capillary, using an adhesive having an index of refraction adapted to the fiber material, thus assuring an undisturbed passage of stray light from the fiber sheath to the blackened outer side of the capillary.

It is furthermore advantageous, for anti-reflection purposes at the end surface of the optical fiber, to place a quartz or glass plate provided with an anti-reflection layer onto the end surface of the fiber or capillary, advisedly also by means of an adhesive of adapted refractive index. This precaution is simpler than the direct application of an anti-reflection layer onto the end surface of the fiber.

DETAILED DESCRIPTION

The invention will be described in detail for a preferred embodiment, in conjunction with the accompanying drawings, in which.

Figure 1:
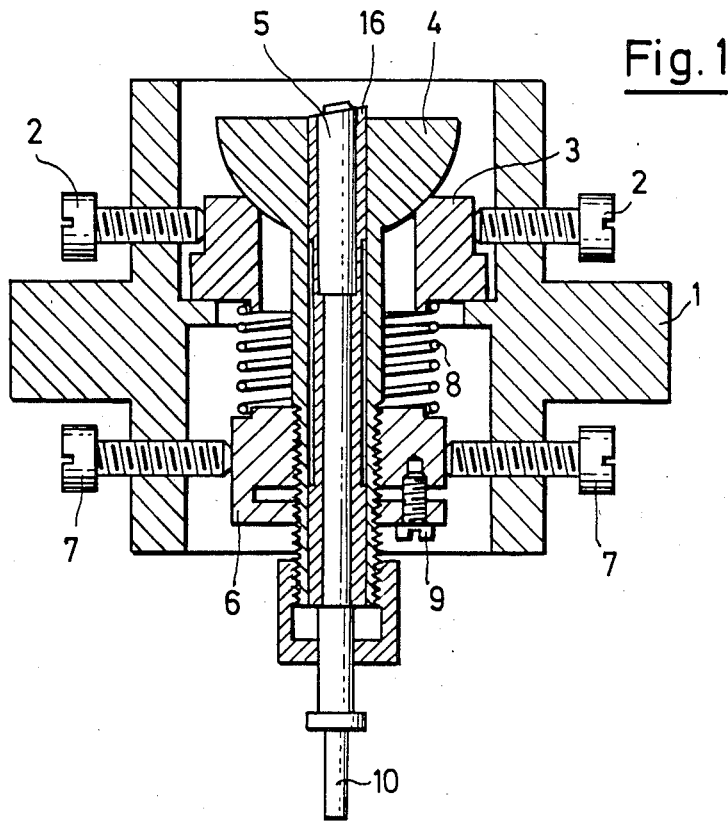
FIG. 1 is a longitudinal section through a complete adjustable coupling fixture which mounts coupling means for the end of a monomode fiber.

The adjustable fixture of FIG. 1 comprises a housing 1 which contains means for adjustably mounting the end 5 of an optical fiber 10 of the polarization-maintaining type. More particularly, an insert part 4 retains the fiber end 5 and is adjustably positionable, via screws 2 at the upper end and screws 7 at the lower end of the housing 1. The insert piece 4 has the shape of a hemisphere at one end. This hemisphere is loaded by a spring 8 against a seating ring 3, and the position of ring 3 can be adjusted transversely to the fiber axis via the screws 2. In this connection, spring 8 compressionally reacts against the bottom of ring 3 and against a nut 6 which is threaded to the tail end of part 4 and can be clamped.

The angular orientation of insert part 4 is adjusted by the screws 7 at the lower end of the mount 1, pressing laterally against the nut 6. The hemispheric center of part 4 is at the end surface of the fiber, so that the end of the fiber will remain longitudinally fixed when making this angular adjustment.

The insert part 4 is also rotatable about the longitudinal axis of the fiber, so that the preferred orientation direction of the fiber can be adapted to the direction of polarization of the laser beam to be coupled. After adjustment of the angular position, the insert piece 4 is fixed by tightening a screw 9 which clamps nut 6 to the thread of part 4.

Figure 4:
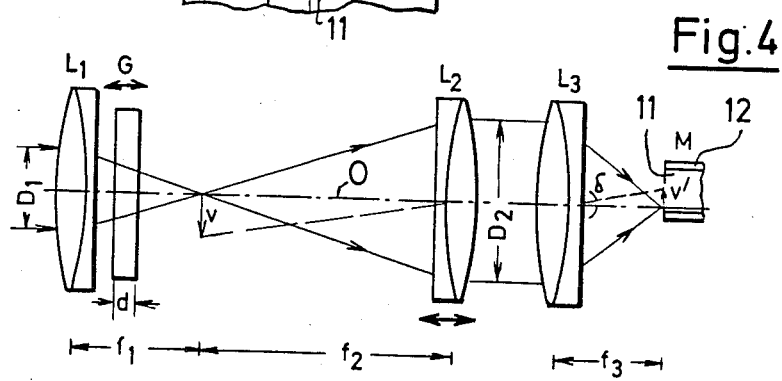
FIG. 4 is a diagram of an optical system for directing laser radiation to the coupling means.

The adjustment mount 1 will be understood to be connected to a bushing on the housing of a laser generator, but the detailed mechanical construction of such a connection is not needed for present description and is therefore not shown in detail. On the apparatus side, i.e., between the laser and the optical-fiber end 5, an optical system is provided pursuant to the sketch of FIG. 4. This optical system consists of two lenses $L_1$ and $L_2$ by which a laser beam of diameter $D_1$ is widened to a diameter $D_2$, and a third lens $L_3$ focuses the widened laser beam onto the end surface of the core 11 of the optical fiber. This widening, which is determined by the ratio of the focal lengths $f_1$, $f_2$ of the two lenses $L_1$, $L_2$, is necessary so that the size of the focused laser spot can be adapted to the diameter of the core 11.

Between the lenses $L_1$, $L_2$, a non-reflecting (e.g., anti-reflection coated) flat glass plate G is, as indicated by double-headed arrow, selectively tiltable in two component directions perpendicular to the optical axis (O). This plate G serves as an adjusting means to precisely align the focused laser spot on the coupling means, namely, at the end surface of the core 11 of the optical fiber. For axially positioning this focus at the end of the fiber, the lens $L_2$ is displaceable along the optical axis, as suggested by another double-headed arrow.

Figure 2:
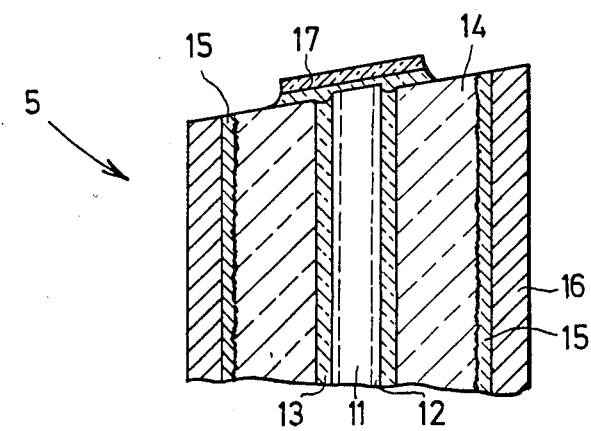
FIG. 2 is an enlarged fragmentary sectional view of the coupling means of FIG. 1.

The end 5 of the optical fiber is developed as the coupling means and has the construction shown in greater detail in FIG. 2. The individual fiber, which consists of a core 11 of greater index of refraction and a sheath 12 of lesser index of refraction, is inserted (using a transparent adhesive 13) into a glass capillary 14 having an index of refraction which corresponds to that of the fiber sheath 12. The index of refraction of the adhesive 13, namely, n equal to about 1.50, is also adapted to that of the sheath 12 and of the capillary 14.

The capillary 14 is externally roughened and, in turn, is mounted in a metal sleeve 16 in order to prevent breakage, using a blackened adhesive 15.

A small non-reflecting glass plate 17 is bonded to the end of the coupling means, which consists of fiber 11 and its sheath 12, capillary 14, and sleeve 16; and the glass plate 17 extends not only over the end of the fiber 11, 12 but also over a surrounding annular region of the end surface of the capillary 14 which adjoins the fiber. The solvent-free adhesive (13) which has already been used for the fiber-capillary connection can also be used for this bonding of plate 17. The adhesive also serves to equalize differences in height which arise in constructing the end of the coupling means.

The described structural measures account for the result that light which enters at the end alongside the fiber core 11 and therefore, for example, into the fiber sheath 12 or even into the capillary 14, passes without further reflection through the adhesive layer 13 and through the capillary to the roughened outer surface thereof, being absorbed in the surrounding blackened adhesive layer 15. Light alongside that which is coupled into the fiber core therefore does not contribute to the intensity of scattered light.

Figure 3:
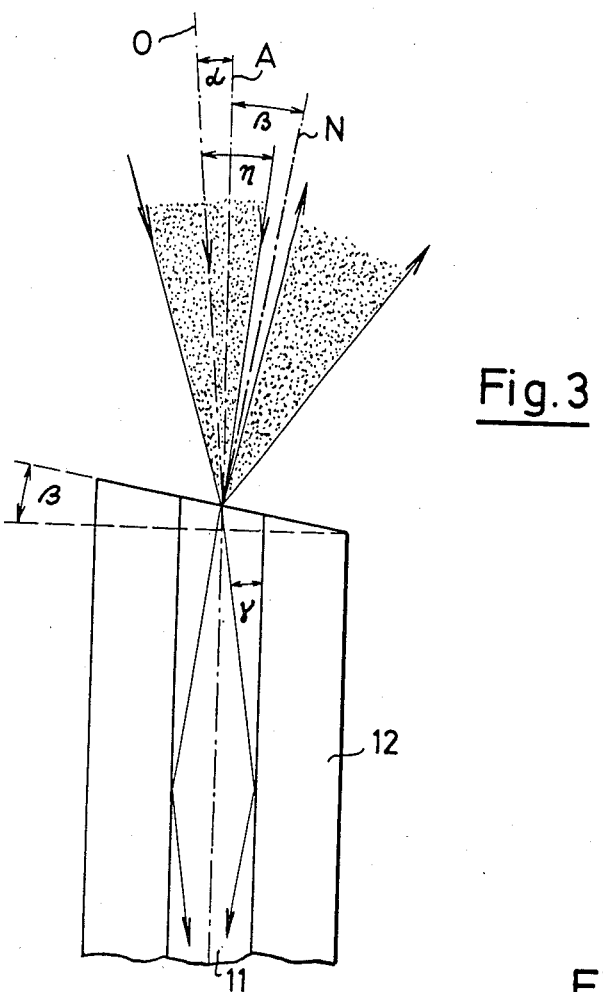
FIG. 3 is a sketch serving to explain ray geometry involved in coupling incident laser radiation into the fiber of FIGS. 1 and 2.

To the extent that any residual reflections occur at the surface of the non-reflecting plate 17, the result is obtained, by beveling the end surface, that this disturbing light is not scattered back on the optical axis but, rather, is directed outside the aperture angle $\eta$ of the light entering into the fiber core 11. To this end, as shown to scale in FIG. 3, the bevel is such that the normal N to the surface of the end of the fiber is inclined at an angle $\beta$ to the longitudinal axis (A) of the fiber 11, 12, so that $$\sin \beta \geqq \sin \eta / n_k$$

wherein $n_k$ is the index of refraction of the fiber core. Using customary values for $\eta$ and $n_k$, the angle of inclination $\beta$ amounts to about 10°. Furthermore, the optical axis (O) of the system $L_1$, $L_2$, $L_3$ which couples laser light into the fiber 11, 12 is preferably tilted by an angle $\alpha$ to the fiber (A), for which we have $$\sin \alpha = \sin \eta \left( 1 - \frac{1}{n_k} \right).$$

As a result of refraction after entrance into the fiber core 11, the middle ray on the optical axis (O) extends in the direction of the longitudinal axis (A) of the fiber while the edge rays which enter with the aperture angle $\eta$ are guided under the critical angle $\gamma$ for inner total reflection within the core 11 of the fiber.

What is claimed is:

1. Coupling means for coupling laser radiation into a monomode optical fiber (11, 12) of the polarization-maintaining type, characterized by the fact that the end of the fiber is inserted into a transparent capillary (14) and is beveled and that the capillary (14) is surrounded by a jacket of light-absorbing material (15), the end of the fiber being bonded into the capillary (14) by means of a transparent adhesive (13) having an index of refraction which is adapted to the fiber, and the capillary (14) being roughened on the outside and bonded into a metal sleeve (16) by means of a light-absorbing adhesive (15).

2. Coupling means according to claim 1, characterized by the fact that the end surface of the fiber (11, 12) is completely non-reflecting and that the end surface of the capillary (14) is non-reflecting at least in an annular region adjoining the fiber (11, 12).

3. Coupling means according to claim 1, characterized by the fact that non-reflecting glass or quartz plate (17) is bonded by means of a transparent adhesive onto the end surface of the fiber (11, 12) and/or of the capillary (14).

4. Coupling means according to claim 1, characterized by the fact that the angle ($\beta$) by which the end of the fiber is beveled is about 10°.

5. Coupling means according to claim 1, characterized by the fact that both the fiber end and the capillary end are beveled at the same angle ($\beta$) of about 10°.

6. Coupling means for coupling laser radiation into a monomode optical fiber (11, 12) of the polarization-maintaining type, characterized by the fact that the end of the fiber is inserted into a transparent capillary (14) and is beveled and that the capillary (14) is surrounded by a jacket of light-absorbing material (15), characterized by the fact that the capillary and the fiber end (5) are positioned in a adjustment mount (1, 4) which permits adjustment of the relative rotary position between the fiber (11, 12) and the direction of polarization of the light which is to be coupled into the fiber.

7. Coupling means for coupling laser radiation into a monomode optical fiber (11, 12) of the polarization-maintaining type, characterized by the fact that the end of the fiber is inserted into a transparent capillary (14) and is beveled and that the capillary (14) is surrounded by a jacket of light-absorbing material (15), characterized by the fact that in front of the end of the fiber there is arranged an optical system ($L_1$, $L_2$, $L_3$) which widens the diameter ($D_1$) of the laser beam to be coupled into the fiber and then focuses it on the fiber core (11), and that the optical system contains adjustment means (G, $L_2$) for adjusting the focus of the laser.

8. Coupling means for coupling incident laser radiation into an end of monomode optical fiber, wherein said fiber comprises a core having a first refractive index and a cladding having a second refractive index which is less than said first refractive index, a transparent capillary having a bore in which said optical fiber is fixedly mounted in a longitudinal region near and up to said fiber end, said fiber end and the corresponding end of said capillary being sloped to accord with a single plane which is inclined to a normal to the axis of the fiber, and a substantially totally opaque light-absorbing jacket surrounding said capillary, whereby such laser radiation as is directed to have incidence with said sloped end and within the aperture angle for entry into the fiber core will be the only light accepted for transmission by the fiber core, and further whereby laser radiation entering said sloped end outside said aperture angle will be absorbed by said jacket.

9. Coupling means according to claim 8, wherein the inclination angle ($\beta$) of said sloped end is such that:

$$\sin \beta \geq \sin \eta / n_k$$

where $n_k$ is the refractive index of the fiber core and $\eta$ is the aperture angle.

10. Coupling means according to claim 8, further comprising an optical system having an axis (O) for coupling laser radiation into said core, said system axis being inclined at an angle $\alpha$ to the fiber axis, wherein:

$$\sin \alpha = \sin \eta \left(1 - \frac{1}{n_k}\right).$$

where $n_k$ is the refractive index of the core and $\eta$ is the aperture angle.

* * * * *